Sept. 20, 1971  J. HALLER  3,605,518
REINFORCED-TOOTH GEAR
Filed Nov. 12, 1969
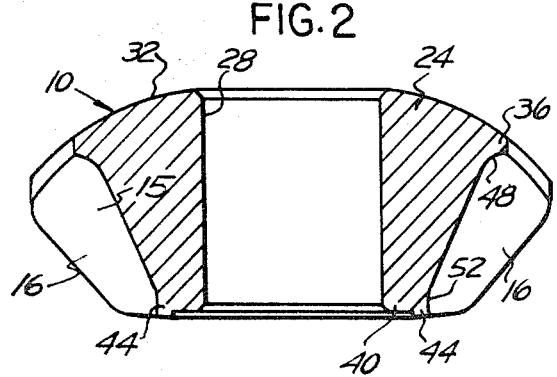
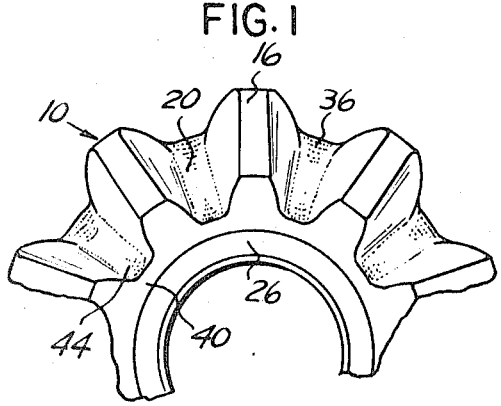
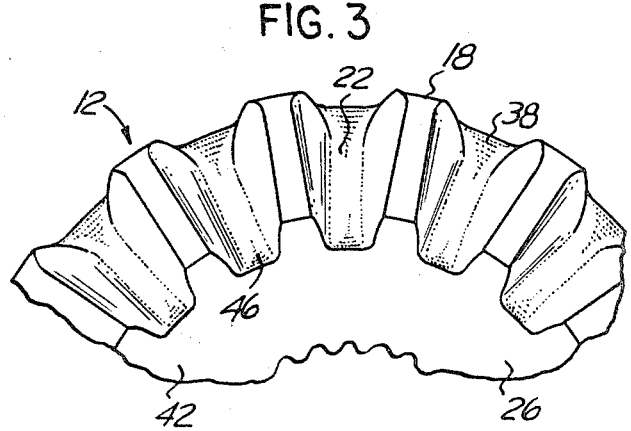
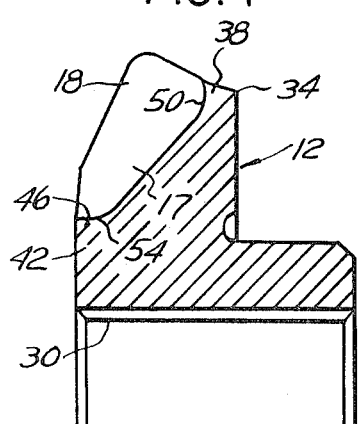
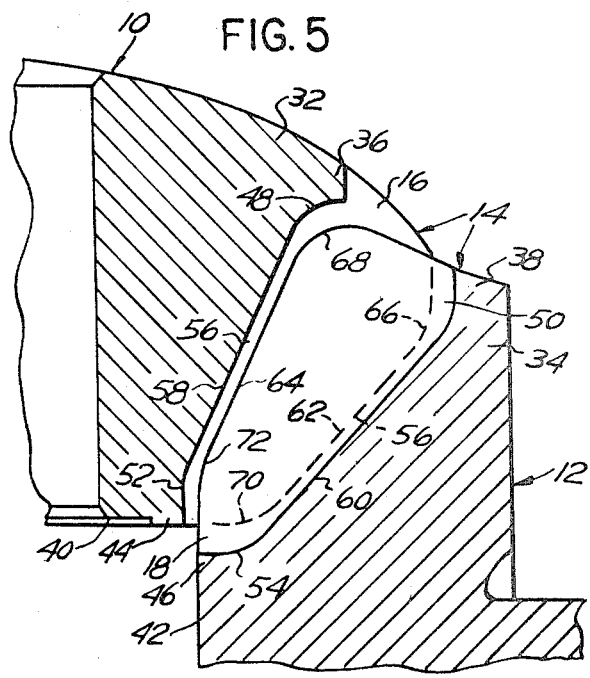
INVENTOR
JOHN HALLER
BY Barthel & Bugbee
ATTORNEYS United States Patent Office 3,605,518
Patented Sept. 20, 1971

3,605,518
REINFORCED-TOOTH GEAR
John Haller, Northville, Mich., assignor to Federal-Mogul Corporation, Southfield, Mich.
Filed Nov. 12, 1969, Ser. No. 875,974
Int. Cl. F16h 55/04; B21d 53/28
U.S. Cl. 74—459.5
8 Claims

ABSTRACT OF THE DISCLOSURE

The roots of the teeth of a gear are interconnected at either or both of their opposite ends by reinforcement portions consisting of ribs extending between adjacent teeth and projecting outward from the bottoms of the spaces therebetween. The intermediate portions of the teeth of the gear have running contact and engagement between the reinforcement ribs at either or both ends of a similarly-reinforced meshing gear, so that the ribs strengthen the teeth without interfering with their rolling engagement or "run-off." Such gears with rib-connected teeth are made by sintered powder metallurgy as the outward projection of the ribs into the spaces between the teeth from the bottoms of said spaces prevents their manufacture by conventional gear-forming processes which require a run-through of the gear-forming tool between adjacent teeth.

BACKGROUND AND SUMMARY OF THE INVENTION

Conventional toothed wheels, such as gears, when made from solid material, such as metal or plastic, have troughs or spaces between their teeth which are substantially straight-bottomed from one end to the other, from the nature of the cutter or other gear-forming machine which produces them. The straight-bottomed trough or space between teeth results from the necessity of the tooth-forming tool passing through the troughs or spaces in forming the teeth. The present invention by molding the gears and pinions from powdered metal or synthetic plastic, such as nylon, which is then sintered, enables the troughs or inter-tooth spaces to be provided with reinforcing ribs which greatly strengthen the teeth of the gears and pinions thus produced in the present specification and claims, the word "gear" is used generically to include both pinions and gears, in preference to the archaic generic word "cogwheel," and bevel gears are shown by way of exemplification but not limitation.

In the drawings:

FIG. 1 is a fragmentary front elevation of a reinforced-tooth bevel pinion, according to one form of the invention;

FIG. 2 is a diametral section through the pinion of FIG. 1;

FIG. 3 is a fragmentary front elevation of a reinforced-tooth bevel gear, according to the invention, adapted to mate with the pinion of FIGS. 1 and 2;

FIG. 4 is a diametral section through the bevel gear of FIG. 3; and

FIG. 5 is a fragmentary diametral section through the reinforced-tooth bevel pinion of FIG. 1 and bevel gear of FIG. 3 disposed in meshing engagement with one another.

Referring to the drawings in detail, FIGS. 1 and 2 show a reinforced-tooth gear, particularly a bevel pinion, generally designated 10, while FIGS. 3 and 4 show a reinforced-tooth gear, particularly a bevel gear, generally designated 12, adapted to intermesh with one another, without interference between their teeth, in a gear set shown diagrammatically in FIG. 5 and generally designated 14. Since the configurations of the pinion 10 and gear 12 which mesh with one another are similar, they are conveniently described simultaneously, but with the use of different reference numerals for similar parts. The pinion 10 and gear 12 thus have teeth 16 and 18 respectively having roots 15 and 17 respectively and separated from one another by troughs or inter-tooth spaces 20 and 22 respectively and projecting radially outward from bodies 24 and 26 respectively. The gear bodies 24 and 26 have shaft bores 28 and 30 respectively extending axially therethrough.

At their larger diameter ends 32 and 34 respectively, the pinion teeth 16 and gear teeth 18 are interconnected by reinforcement ribs 36 and 38 respectively, while at their smaller diameter ends 40 and 42 respectively they are similarly interconnected by reinforcement ribs 44 and 46 respectively but of slightly different shapes in order to provide clearance without interference during intermeshing running engagement as shown in FIG. 5. For this purpose, the large end ribs 36 and 38 project outward more abruptly than the small end ribs 44 and 46. It will be understood that the gear teeth may be reinforced by providing such interconnecting ribs at one end only of their respective troughs or grooves, but with an accordingly lessened strength than where such reinforcing ribs are provided at opposite or both ends of the troughs or inter-tooth spaces.

The ribs 36 or 38 of the pinion 10 or gear 12 at their larger diameter ends 32 and 34 respectively have inner faces 48 or 50 respectively which are of smaller diameters when measured in a radial plane than the inner faces 52 or 54 at the smaller diameter ends 40 or 42 respectively to provide the necessary clearance spaces 56 for the teeth 16 and 18 respectively (FIG. 5) between their longitudinally substantially straight intermediate portions 58 and 60 of their troughs and the corresponding longitudinally-straight intermediate portions 62 and 64 of their teeth 16 and 18. The teeth 16 and 18 of the pinion 10 and gear 12 are provided with curved outer ends 66 and 68 respectively and curved inner ends 70 and 72 respectively.

The pinion 10 and gear 12 are produced from powdered metal or powdered synthetic plastic, such as nylon, by conventional machines and methods known to those skilled in powder metallurgy, except that the molds for producing the briquettes which are subsequently sintered conventionally to produce the pinion 10 and gear 12 are provided with the necessary recesses required to form the ribs 36 and 44 of the pinion 10 and the ribs 38 and 46 of the gear 12.

In the use of the invention, the pinion 10 and gear 12 are mounted so that their respective teeth 16 and 18 have rolling engagement with one another along their intermediate portions but have clearances at their opposite ends where their respective ribs 36, 38, 44 and 46 occur. Thus, the outer and inner ends of the teeth 16 and 18 are greatly strengthened by the bridging effects of their respective ribs, thereby increasing the working lives of these toothed wheels 10 and 12 and consequently enabling them to successfully sustain heavier working loads than is possible with conventional gears made from sintered powdered materials such as metal or nylon or from solid metal. Conventional gears cannot be provided with such reinforcements because of the difficulty involved in machining the troughs or spaces between the teeth thereof by tools which must run through said spaces from end to end thereof.

I claim:

1. A reinforced-tooth gear, comprising
a gear body, circumferentially-spaced gear teeth having roots connected to said body and having circumferentially spaced troughs disposed between said teeth, and reinforcement portions projecting into said inter-tooth spaces from at least one end of said gear body and extending across said inter-tooth spaces and interconnecting adjacent teeth.

2. A reinforced-tooth gear, according to claim 1, wherein other reinforcement portions are provided which project into said inter-tooth spaces from the other end of said gear body and also interconnect adjacent teeth at the opposite ends thereof from said first-mentioned reinforcement portions.

3. A reinforced-tooth gear, according to claim 1, wherein said reinforcement ribs project outward from the bottoms of the inter-tooth spaces and extend between said roots of said teeth.

4. A reinforced-tooth gear, according to claim 1, wheresaid gear body, said gear teeth and said reinforcement portions are composed of sintered powdered material.

5. A reinforced-tooth gear, according to claim 1, wherein the bottoms of said inter-tooth spaces apart from said reinforcement bottoms are substantially straight in directions longitudinally thereof.

6. A reinforced-tooth gear, according to claim 1, wherein the inner sides of said reinforcement portions are of arcuate configuration, and wherein the nearer ends thereto of adjacent teeth have corners of correspondingly arcuate configuration.

7. A reinforced-tooth gear, according to claim 2, wherein the inner sides of said reinforcement portions at both ends of said inter-tooth spaces are of arcuate configuration, and wherein the nearer ends thereto of adjacent teeth have corners of arcuate configuration corresponding to the arcuate configuration of said reinforcement portions.

8. A reinforced-tooth gear, according to claim 7, wherein the bottoms of said inter-tooth spaces intermediate said arcuate inner sides of said reinforcement portions are substantially straight in directions longitudinally thereof.

References Cited
UNITED STATES PATENTS

| | | | |
|---|---|---|---|
| 2,778,240 | 1/1957 | Prester | 74—459.5 |
| 3,180,172 | 4/1965 | Leggat | 74—462 |
| 3,191,453 | 6/1965 | Hoven | 29—159.2X |

LEONARD H. GERIN, Primary Examiner

U.S. Cl. X.R.

29—159.2